H. W. LIGON.
MECHANICAL STARTER FOR AUTOMOBILE ENGINES.
APPLICATION FILED OCT. 30, 1916.

1,217,466.

Patented Feb. 27, 1917.
3 SHEETS—SHEET 1.

Inventor
H. W. Ligon, by
T. A. Witherspoon
Attorney

H. W. LIGON.
MECHANICAL STARTER FOR AUTOMOBILE ENGINES.
APPLICATION FILED OCT. 30, 1916.

1,217,466.

Patented Feb. 27, 1917.
3 SHEETS—SHEET 2.

Inventor
H. W. Ligon, by
J. G. Witherspoon
Attorney

H. W. LIGON.
MECHANICAL STARTER FOR AUTOMOBILE ENGINES.
APPLICATION FILED OCT. 30, 1916.
1,217,466.
Patented Feb. 27, 1917.
3 SHEETS—SHEET 3.
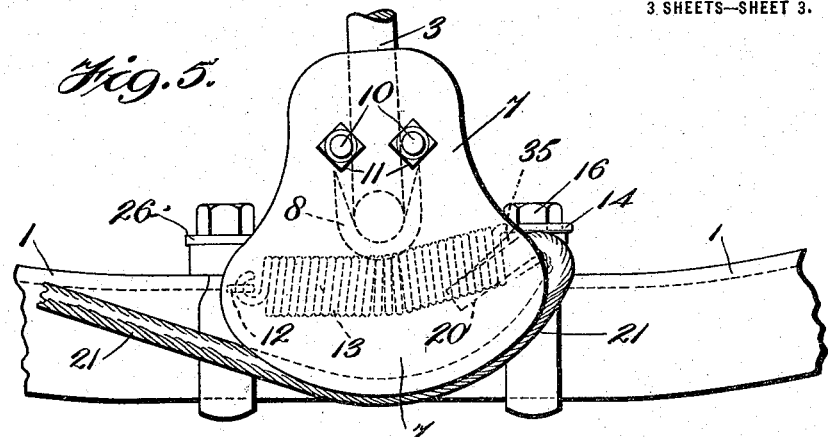
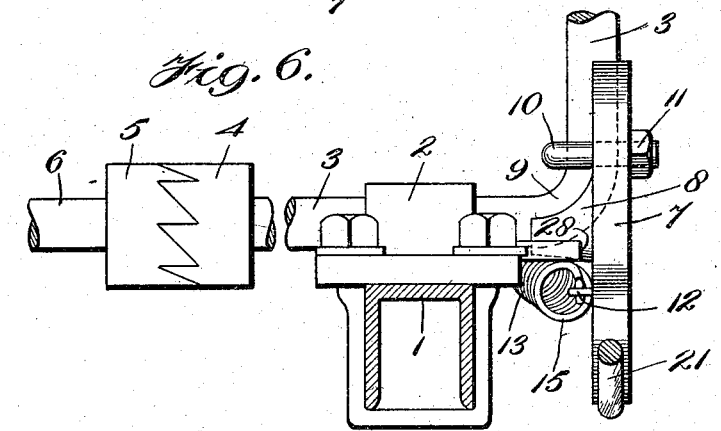
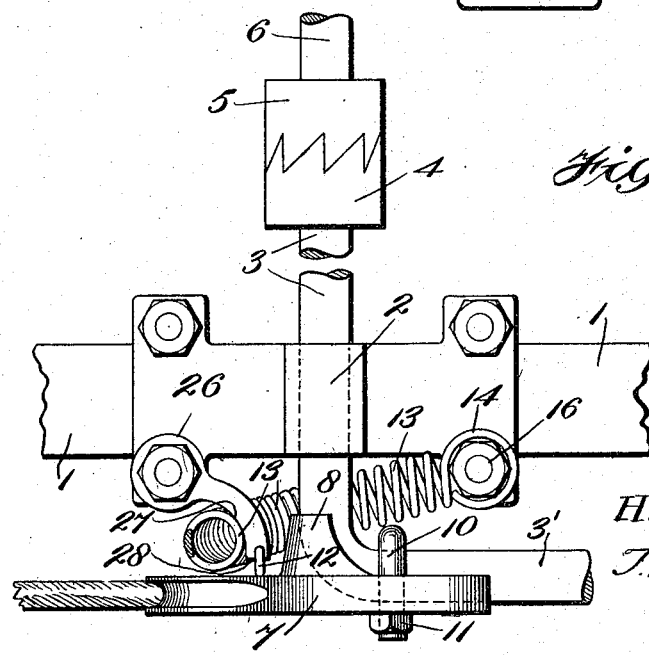
Inventor
H. W. Ligon, by
T. A. Witherspoon
Attorney

UNITED STATES PATENT OFFICE.

HARRY W. LIGON, OF ATLANTA, GEORGIA.

MECHANICAL STARTER FOR AUTOMOBILE-ENGINES.

1,217,466.  Specification of Letters Patent.  Patented Feb. 27, 1917.

Application filed October 30, 1916. Serial No. 128,482.

*To all whom it may concern:*

Be it known that I, HARRY W. LIGON, a citizen of the United States, residing at Atlanta, in the county of Fulton and State of Georgia, have invented certain new and useful Improvements in Mechanical Starters for Automobile-Engines; and I do hereby declare the following to be a full, clear, and exact description of the invention, such as will enable others skilled in the art to which it appertains to make and use the same.

This invention relates to mechanical starters for automobile engines and has for its objects to provide a starter of this character which will be simple in construction, more efficient in operation and less costly to manufacture than those heretofore proposed.

With these and other objects in view the invention consists of the novel details of construction and combinations of parts more fully hereinafter disclosed and particularly pointed out in the claims.

Referring to the accompanying drawings forming a part of this specification in which like numerals designate like parts in all the views:—

Fig. 5 is a front elevational view somewhat similar to Fig. 4, but showing the parts in a different position;

Fig. 6 is a side elevational view partly in section of the parts as seen from the left of Fig. 5; and Fig. 7 is a view similar to Fig. 3 but showing the parts in a position intermediate to those illustrated in Figs. 3 and 5.

Figure 1:
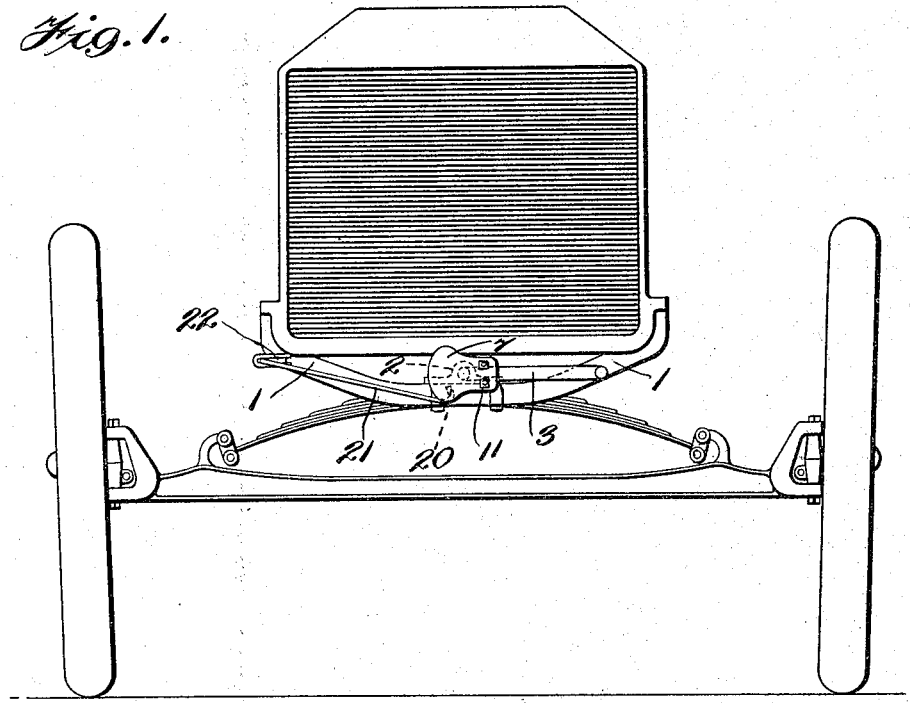
Figure 1 is a diagrammatic front elevational view of an automobile equipped with one form of this invention.

1 designates the usual frame of an automobile to which the device is adapted to be applied, having mounted thereon the bearing block 2, in which is slidably mounted the starting crank 3, provided at one end with the usual clutch member 4 adapted to engage the companion clutch member 5 carried by the crank shaft 6 of the engine. 7 represents a rotatable disk, cam or plate provided with the hub or lug 8 forming a socket into which the elbow 9 of the crank 3 is adapted to fit.

The said plate 7 is secured to the starting crank 3 in any suitable manner as for example, by means of the U-bolt 10 and threaded nuts 11.

Secured at one end 15 to the plate 7, as indicated at 12, is the helical or other spring 13, whose other end 14 is secured to the bearing block 2 as by the bolt 16. The axis of the spring 13 is inclined to and extends across the axis of the crank 3, as shown, so that when the crank is turned said spring will be extended, or put under tension, and thus pull said crank 3 bodily of its length so as to engage the clutch members, all as will be clear from the drawings.

Secured to the plate 7 as at 20, is the pull cord or other connection 21 leading through the guide or pulley 22 on the frame 1 to the lower end of the foot lever 23, pivoted as at 24, and carrying the pedal 25 located within easy reach of the chauffeur.

Also carried by the block 2 is the stop or dog 26 curved as at 27 for a purpose presently to be discovered.

Figure 2:
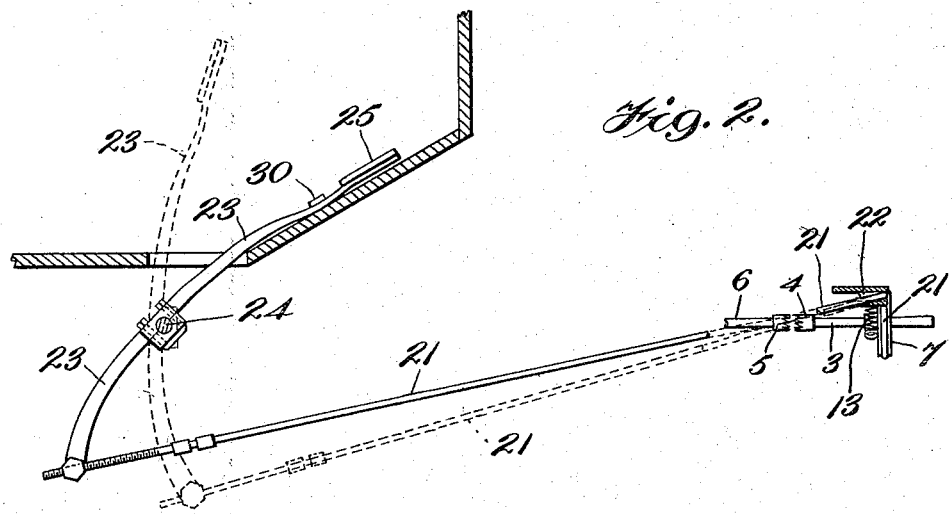
Fig. 2 is a diagrammatic side elevational view of the form of the invention shown in Fig. 1.
Figure 3:
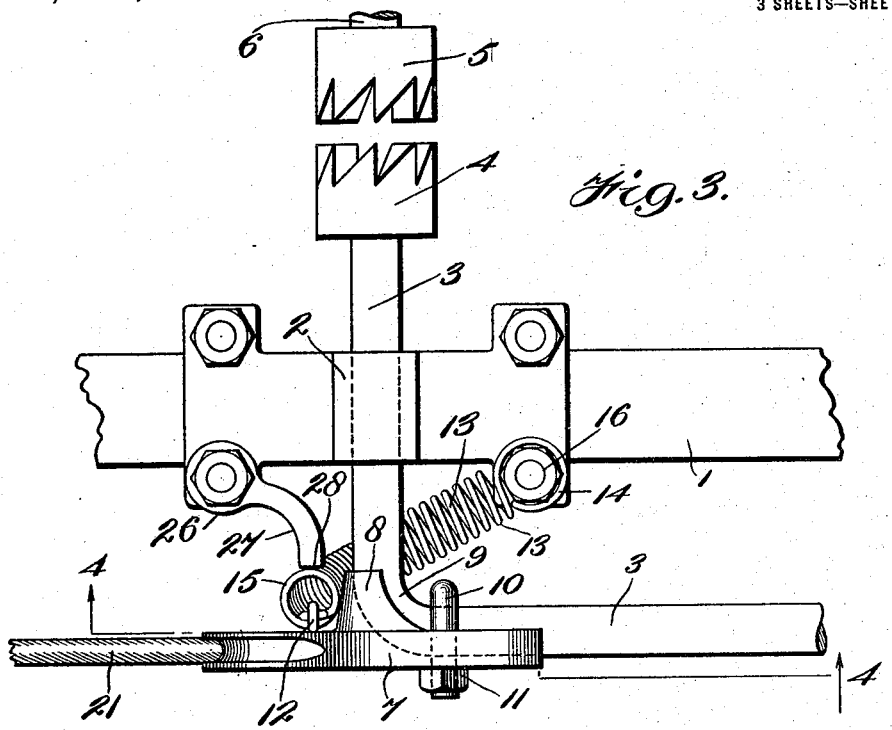
Fig. 3 is a top plan view of a portion of the parts shown in Fig. 1, showing the said parts in their normal or neutral positions.
Figure 4:
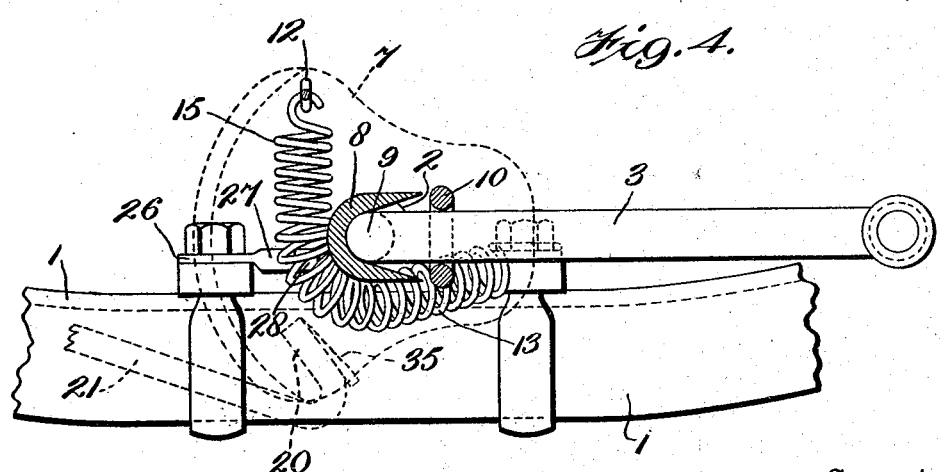
Fig. 4 is a sectional elevational view taken on the line 4—4 of Fig. 3, the cutaway portions being illustrated in dotted lines.

In operation the parts are normally in the position shown in Figs. 1, 2, 3 and 4, the spring 13 being under tension and thus tending to force the clutch members 4 and 5 into engagement with each other. But owing to the extreme end 28 of the dog 26 engaging said spring 13, as plainly shown in Fig. 3, the said clutch members are normally held out of engagement. It being desired to start the engine the catch 30 which holds the starting lever 23 in the full line position shown in Fig. 2, is released whereupon the tension of the said spring 13 will move said lever from its full line position to its dotted line position also shown in Fig. 2, and the parts will assume the positions shown in Figs. 5 and 6, the spring 13 having pulled the crank member 3 bodily of its length, causing the clutch members to engage, and having had its tension substantially relieved as indicated in Fig. 5. In the meantime the plate 7 and crank 3 have turned in a counter-clockwise direction as seen in Fig. 4, and through an angle of about 90°, as will be clear from said Fig. 5.

The clutch members 4 and 5 having been engaged and the starting lever 23 brought to its dotted line or starting position indicated in Fig. 2, a return of said lever from its dotted line to its full line position will, while said clutch members are still engaged, move said crank 3 and plate 7 back in a clockwise direction through an angle of 90° and thus start the engine.

The rotation of the plate 7, hub 8 and crank member 3 in the said clockwise direction while the clutch members are engaged and while the end 15 of the spring is in close juxtaposition to the dog 26, will cause said spring 13 to wind around the curved surface 27 of said dog as plainly shown in Fig. 7. In this position of parts the engine will start and the rotation of the clutch member 5 by the engine will now force the member 4 and crank 3 bodily away from said member 5, whereupon the spring 13 will slide down the curved portion 27 of the dog 26 until it rests beneath the extreme end 28 of said dog or until it reaches the position of the parts illustrated in Fig. 3, whereupon the cycle may be repeated.

As stated above the extreme end 20 of the pull cord 21 is detachably secured to the plate or cam 7 and any suitable means may be provided for such detachable connection. In the drawings there is conventionally shown a wedge 35 serving this purpose. Accordingly when it is desired to start the engine by the crank handle 3', it is only necessary to detach the said end 20 of the cord 21 and to lift off the end 14 of the spring 13 from the bolt 16, whereupon the crank 3 may be operated in the usual manner to start the engine.

It is obvious that those skilled in the art may vary the details of the construction as well as the arrangement of parts without departing from the spirit of the invention, but is not desired to be limited to the above disclosure except as may be required by the claims.

What is claimed is:—

1. In a starting device for automobile engines the combination of a pair of clutch members; a crank member carrying one of said clutch members; a single means normally under tension adapted to simultaneously rotate and to slidably move said crank member; and means normally preventing said last named means from acting, substantially as described.

2. In a starting device for automobile engines the combination of a pair of clutch members; a crank member carrying one of said clutch members; a member normally under tension adapted to rotate and to slidably move said crank member; and means comprising a dog, a lever and a holding catch for said lever normally preventing said last named member from acting, substantially as described.

3. In a starting device for automobile engines the combination of a pair of clutch members; a slidable crank member carrying one of said clutch members; a rotatable plate rigid with said crank member; a member normally under tension adapted to slidably move said crank member to cause an engagement between said clutch members; a lever connected to said plate and adapted to rotate the same; a catch to hold said lever; and a dog to prevent a sliding movement of said clutch member until said plate and crank member are rotated, substantially as described.

4. In a starting device for automobile engines the combination of a pair of clutch members; a slidable crank member carrying one of said clutch members; a rotatable plate rigid with and detachably secured to said crank member; a member comprising a coiled spring normally under tension adapted to slidably move said crank member to cause an engagement between said clutch members; a lever connected to said plate and adapted to rotate the same; a catch to hold said lever; and a dog provided with a curved portion adapted to hold said spring and to prevent a sliding movement of said clutch member until said plate and crank member are rotated, substantially as described.

In testimony whereof I affix my signature, in presence of two witnesses.

HARRY W. LIGON.

Witnesses:
J. M. PARDER,
W. B. MATTHEWS.

Copies of this patent may be obtained for five cents each, by addressing the "Commissioner of Patents, Washington, D. C."